United States Patent
Hwang et al.

(10) Patent No.: US 9,799,900 B2
(45) Date of Patent: Oct. 24, 2017

(54) FUEL SUPPLYING APPARATUS AND SYSTEM FOR DIRECT CARBON FUEL CELL

(71) Applicant: KOREA INSTITUTE OF INDUSTRIAL TECHNOLOGY, Cheonan-si (KR)

(72) Inventors: Jun-Young Hwang, Yongin-si (KR); Kyung-Tae Kang, Seoul (KR); Heui-Seok Kang, Seoul (KR); Sang-Ho Lee, Seoul (KR)

(*) Notice: Subject to any disclaimer, the term of this patent is extended or adjusted under 35 U.S.C. 154(b) by 216 days.

(21) Appl. No.: 14/414,819

(22) PCT Filed: Dec. 18, 2012

(86) PCT No.: PCT/KR2012/011110
§ 371 (c)(1),
(2) Date: Jan. 14, 2015

(87) PCT Pub. No.: WO2014/014174
PCT Pub. Date: Jan. 23, 2014

(65) Prior Publication Data
US 2015/0180063 A1    Jun. 25, 2015

(30) Foreign Application Priority Data
Jul. 16, 2012 (KR) .................. 10-2012-0077142

(51) Int. Cl.
*H01M 8/04082* (2016.01)
*H01M 8/0637* (2016.01)
(Continued)

(52) U.S. Cl.
CPC ... *H01M 8/04216* (2013.01); *H01M 8/04201* (2013.01); *H01M 8/0637* (2013.01);
(Continued)

(58) Field of Classification Search
CPC ............... Y02E 60/526; H01M 2008/147
See application file for complete search history.

(56) References Cited

U.S. PATENT DOCUMENTS

| 2009/0117429 A1* | 5/2009 | Zillmer ............ B01D 15/00 429/419 |
| 2010/0159295 A1 | 6/2010 | Wolk et al. |

(Continued)

OTHER PUBLICATIONS

Liu, R. et al., "A novel direct carbon fuel cell by approach of tubular solid oxide fuel cells", Journal of Power Sources, vol. 195 (2010), pp. 480-482.

Tang, Y. et al., "Effect of anode and Boudouard reaction catalysts on the performance of direct carbon solid oxide fuel cells", International Journal of Hydrogen Energy, vol. 35 (2010), pp. 11188-11193.

(Continued)

*Primary Examiner* — Jeremiah Smith
(74) *Attorney, Agent, or Firm* — Antonio Ha; U.S. Patent, LLC (57) ABSTRACT

Disclosed is a fuel supplying apparatus, for a direct carbon fuel cell, which has improved output density by ensuring the flow properties of an anode medium. The fuel supplying apparatus for a direct carbon fuel cell comprises: a flow pipe which forms a flow path around a tube-shaped cell contained in an anode medium in which a carbon fuel is mixed; and a bubbling means which provides a gas from below the flow pipe to the inside of the anode medium and thus enables the anode medium to flow by the upward movement of the gas. Consequently, the carbon fuel is forcibly provided to the anode of the tube-shaped cell by the flow of the anode medium which is linked with the upward movement of the gas.

12 Claims, 8 Drawing Sheets

(51) Int. Cl.
*H01M 8/1213* (2016.01)
*H01M 8/1009* (2016.01)
*H01M 8/1246* (2016.01)
*H01M 8/14* (2006.01)
*H01M 8/1233* (2016.01)
*H01M 4/86* (2006.01)
*H01M 8/124* (2016.01)

(52) U.S. Cl.
CPC ....... *H01M 8/1009* (2013.01); *H01M 8/1213* (2013.01); *H01M 8/1246* (2013.01); *H01M 4/8626* (2013.01); *H01M 8/1233* (2013.01); *H01M 8/145* (2013.01); *H01M 2008/1293* (2013.01); *H01M 2008/147* (2013.01); *Y02E 60/526* (2013.01); *Y02E 60/566* (2013.01)

(56) References Cited

U.S. PATENT DOCUMENTS

2011/0014526 A1* 1/2011 Gur .................... H01M 8/0643
429/405
2013/0196238 A1* 8/2013 Harjes ................ H01M 8/1233
429/409

OTHER PUBLICATIONS

Kim, J.-P. et al., "Performance evaluation of tubular fuel cells fuelled by pulverized graphite", Journal of Power Sources, vol. 195, (2010), pp. 7568-7573.

\* cited by examiner

FUEL SUPPLYING APPARATUS AND SYSTEM FOR DIRECT CARBON FUEL CELL

TECHNICAL FIELD

The present invention relates to a direct carbon fuel cell, and more specifically, to a fuel supplying apparatus and system for a direct carbon fuel cell, which have improved output density by ensuring the flow properties of an anode medium.

DISCUSSION OF RELATED ART

While rich countries struggle to reduce $CO_2$ emissions, China, India, and other rising economies are consuming more and more fossil fuels with a high demand for energy. Coal is taking up its position as an important energy resource with its vast worldwide reserves.

However, this fuel source is challenged by steadily increasing $CO_2$ emissions. To address the issue, various approaches are being attempted, which include efficient carbon conversion, extracting pure coal, and direct use of coal as a fuel. However, they are difficult to generally adopt. under different situations and in terms of efficiency and costs.

An attention-receiving alternative is the direct carbon fuel cell (DCFC) technique that may produce gigawatt power by employing coal as an energy source while recycling waste heat.

This novel technology would play is critical role in the distributed power generation industry.

DCFC power generation systems exhibit a high energy conversion efficiency reaching about 80%, which is higher than the thermal power generation systems and the highest among all the existing types of fuel cell systems, Unlike other hid cells, the DCFC directly uses coal or other carbon-containing material as its fuel, which leads to many environmental or economic benefits, such as reduced emissions of SOS, NON, PM, $CO_2$, or other pollutants and noise-free power generation.

A DCFC includes a cathode, an anode, and an electrolyte. Oxygen ions generated by a reduction reaction at the cathode travel to the anode via the electrolyte. The oxygen ions react with carbon at the anode, thus producing $CO_2$. $CO_2$ reacts with the oxygen ions to generate carbonate ions. The carbonate ions oxidize the carbon to generate $CO_2$ and electrons, generating, electricity.

Figure 1:
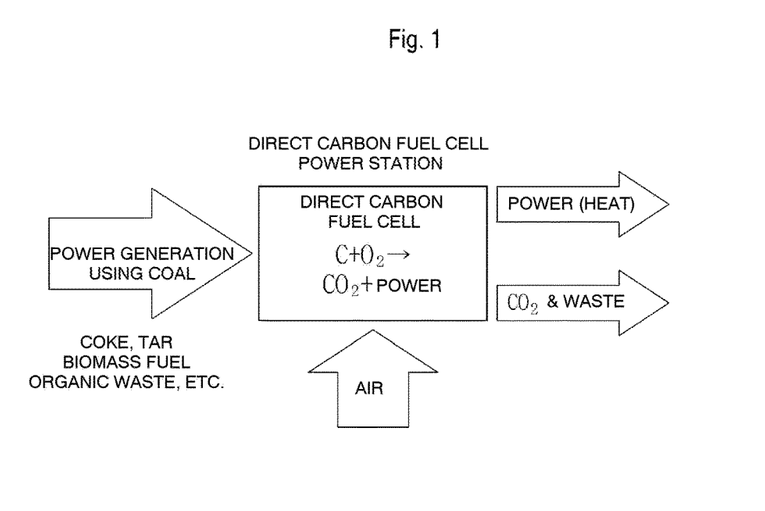
FIG. 1 is a view schematically illustrating an example of generating power in a typical direct carbon fuel cell.

FIG. 1 schematically illustrates an example of power generation by a DCFC.

In order to reduce concentration polarization of the anode to increase output density, the cathode-supported solid oxide electrolyte direct carbon fuel cells using molten carbonate as its anode medium requires the carbon fuel to be mixed well with the anode medium together with forcedly. supplying the anode medium to the fuel cell.

Accordingly, a need exists for a method for forcing the anode medium, i.e., molten carbonate, to flow.

A proposed conventional method is to use a liquid pump.

However, this method is challenged. by the high-corrosive molten carbonate whose temperatures reaches 700° C. to 1000° C.

SUMMARY

An object of the present invention is to provide a fuel supplying apparatus and system for a direct carbon fuel cell, which may increase output density by forcing the molten carbonate, an anode medium, to flow to thereby reduce the concentration polarization of the anode.

Another object of the present invention is to provide a fuel supplying apparatus and system for a direct carbon fuel cell, which may forcedly mix the anode medium formed of a molten carbonate with a carbon fuel and supply the mix to the anode of the direct carbon fuel cell.

Still another object of the present invention is to provide a fuel supplying apparatus and system for a direct carbon fuel cell, in which a flow pipe is formed around one or more tubular cells each including an cathode supporter and a solid oxide electrolyte, and the anode medium may be forced to flow in the flow pipe by supplying carbon dioxide.

According to the present invention, a fuel supplying appall us for a direct carbon fuel cell comprises: a flow pipe forming a flow path around to tubular cell soaked in a fuel electrode medium mixed with a carbon fuel; and a bubbling means supplying a gas from under the flow pipe to an inside of the fuel electrode medium so that the fuel electrode medium flows as the gas moves up, wherein the flow of the fuel electrode medium forces the carbon fuel to be supplied to a fuel electrode of the tubular cell.

Here, the flow pipe includes a collecting part at a lower portion thereof, the collecting part widening downwards, and the collecting part may guide the gas supplied from under the flow pipe to the flow path in the flow pipe.

An end of a supplying pipe included in the bubbling means may be configured to supply the gas to the flow path between the tubular cell and the flow pipe.

The supplying pipe included in the bubbling means extends from top to bottom along an outer wall of the flow pipe, and the end of the supplying pipe may be formed inside a lower portion of the flow pipe.

The supplying pipe may be spirally formed along the outer wall of the flow pipe.

The fuel supplying apparatus may further comprise a distributing member on the flow path in the flow pipe, the distributing member distributing the gas supplied from the bubbling means and supplying upward the distributed gas.

The distributing member may be formed of a disc with multiple through-holes.

The distributing member may include a porous layer.

The bubbling means may independently generate and provide the gas.

The bubbling means may re-circulate and supply the gas that is generated by an electrochemical reaction of the carbon fuel and is then discharged to an outside of the fuel electrode medium.

The flow pipe may form the flow path around a plurality of tubular cells.

Meanwhile, according to the present invention, a fuel supplying system for a direct carbon fuel cell comprises: one or more tubular cells each including an cathode formed at an inside thereof, a anode formed at an outside thereof, and a solid oxide electrolyte formed between the cathode and the anode; and the fuel supplying apparatus supplying a forcedly flowing anode medium to the tubular cells.

Accordingly, the present invention may allow the anode medium to flow so that the carbon fuel may be forced to be supplied to the anode of the direct carbon fuel cell, with the carbon fuel mixed with the anode medium.

Therefore, the concentration polarization Of the anode of the tubular cell in the direct carbon fuel cell may be reduced to increase output density.

DESCRIPTION OF EXEMPLARY EMBODIMENTS

Hereinafter, embodiments of the present invention are described in detail with reference to the accompanying drawings. The terms used herein should be interpreted not in typical or dictionary definitions but to comply in concept with the technical matters of the present invention.

The configurations disclosed in the specification and the drawings are mere examples and do not overall represent the technical spirit of the present invention. Therefore, various changes may be made thereto, and equivalents thereof also belong to the scope of the present invention.

Disclosed is a fuel supplying apparatus for a direct carbon fuel cell having a structure in which power generation is conducted with a tubular cell soaked in a mixture of a liquid anode medium and a carbon fuel.

Here, the tubular cell has a structure in which a cathode and an anode are respectively formed at an inside and outside of the tubular cell, with a solid oxide electrolyte formed between the cathode and the anode.

The cathode may include lanthanum strontium manganite (LSM), and the electrolyte may include ittria-stabilized zirconia (YSZ). The anode may include carbon fuel particles mixed with a circulatable molten salt.

The anode medium may include a molten carbonate, and the carbon fuel may include a carbon powder, a coal powder, coke, a biomass fuel, and an organic waste.

Figure 2:
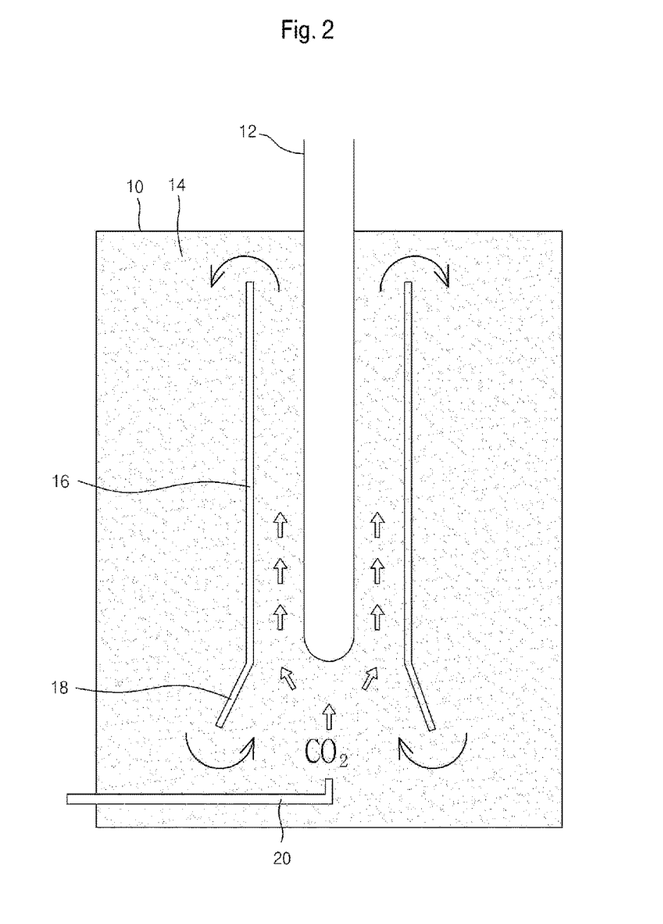
FIG. 2 is a view illustrating a configuration of a fuel supplying apparatus for a direct carbon fuel cell according to a preferred embodiment of the present invention.

Referring to FIG. 2, according to the present invention, one more tubular cells 12 are soaked in a molten carbonate, an anode medium 14 contained in a bath 10.

According to an embodiment of the present invention, a flow pipe 16 is provided to form a vertical-directional cylindrical flow path around the periphery of the tubular cell 12 soaked in the anode medium 14 contained in the bath 10.

The flow pipe 16 has a cylindrical upper portion. A collecting part 18 is integrally formed with the flow pipe 16 at a lower portion of the flow pipe 16. The collecting part 18 is shaped as a trumpet that widens downwards.

By the above configuration, the flow pipe 16 forms a flow path therein while encompassing the tubular cell 12. The flow pipe 16 is disposed to be completely soaked in the anode medium 14 so that flows may be created at an upper side and lower side of the flow pipe 16.

According to an embodiment of the present invention, a bubbling means may be further provided to supply a gas to a lower portion of a cylindrical flow path formed inside the flow pipe 16. The bubbling means is configured so that as a gas supplied from the bubbling means travels upwards, the anode medium 14 flows over the flow path.

A gas supplied from the bubbling means is preferably carbon dioxide ($CO_2$) that is generated as a result of the electrochemical reaction shown in FIG. 1. For the purpose of description, the gas is hereinafter carbon dioxide.

The bubbling means may include a supplying pipe 20 that extends to a lower portion of the flow pipe 16 to supply carbon dioxide, as shown in FIG. 2.

Figure 3:
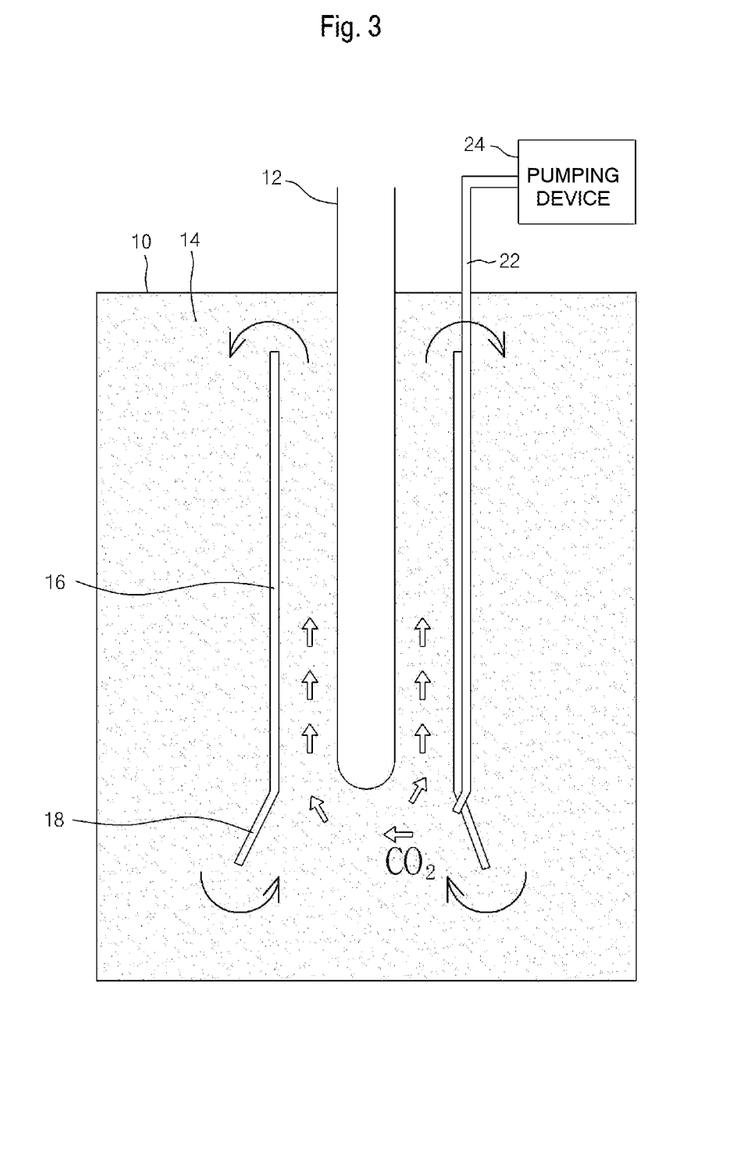
FIGS. 3 and 4 are views illustrating variations of the configuration shown in FIG. 2, adopting different methods for supplying carbon dioxide, according to other embodiments of the present invention.
Figure 4:
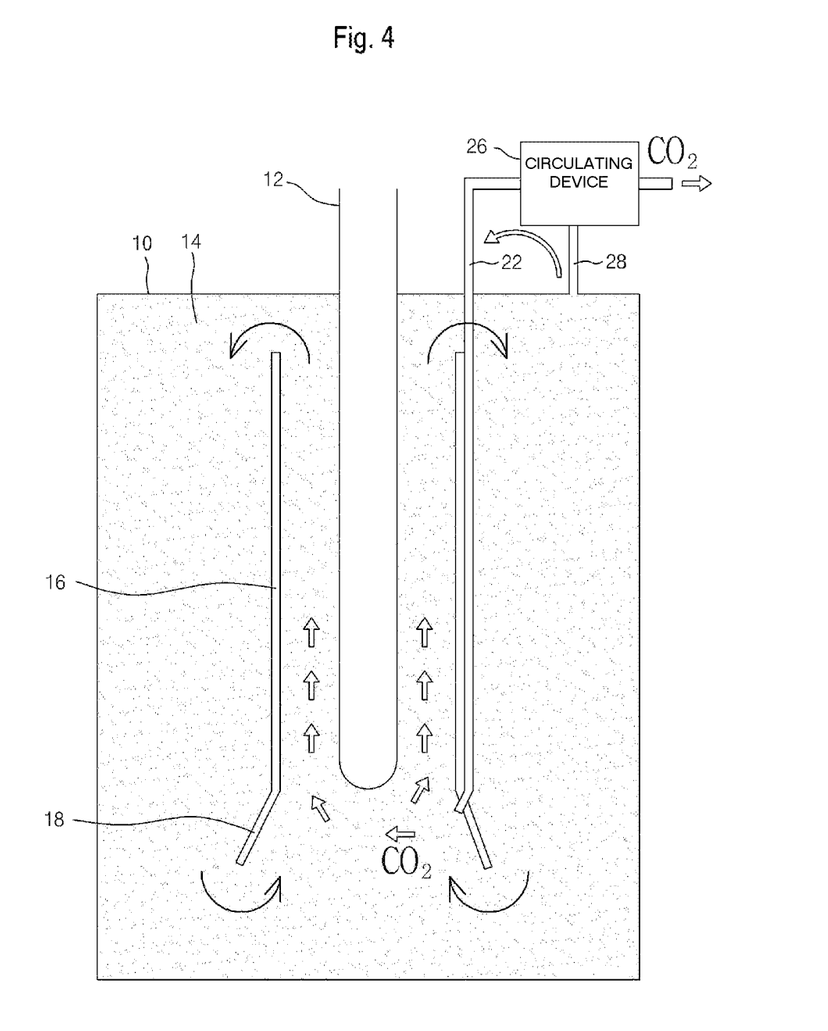

Unlike this, the bubbling means may include a supplying pipe 22 that extends along an outer wall of the flow pipe 16 from top to bottom, as shown in FIGS. 3 and 4.

In case the bubbling means includes the supplying pipe 20 extending to the lower portion of the flow pipe 16 as shown in FIG. 2, an end of the supplying pipe 20 may be positioned to supply carbon dioxide to as lower portion of a flow path formed by the flow pipe 16.

By the configuration shown in FIG. 2, carbon dioxide may be directly supplied to the flow path of the flow pipe 16, or the carbon dioxide may be supplied to be guided to an inner wall of the collecting part 18, and the carbon dioxide may be moved upwards in the flow path.

In case the bubbling means includes the supplying pipe 22 extending from an upper portion to a lower portion thereof along the flow pipe 16 as shown in FIGS. 3 and 4, an end of the supplying pipe 22 is preferably formed at an inside of a lower portion of the flow pipe 16. More preferably, the end of the supplying pipe 22 may be configured to pass through the collecting part 18 to supply carbon dioxide to the inside of the flow pipe 16.

By the configurations shown in FIGS. 3 and 4, carbon dioxide may be supplied to be guided to an inner wall of the collecting part 18, and the carbon dioxide may be moved upwards.

The bubbling means including the supplying pipes 20 and 22 as shown in FIGS. 2 and 3 may include a pumping device 24 that may independently generate and provide carbon dioxide.

Alternatively, the bubbling means may re-circulate and supply carbon dioxide generated by an electrochemical reaction inside the bath 10, as shown in FIG. 4. To this end, the bubbling means may include a circulating device 26 that externally collects carbon dioxide generated by an electrochemical reaction in the bath 10 while re-circulating and supplying a portion of the generated carbon dioxide through the supplying pipe 22.

Referring to FIG. 4, the circulating device 26 may be configured to discharge the carbon dioxide collected to an upper portion of the bath 10 to the outside through an exhaust pipe 28 while circulating and supplying a portion of the carbon dioxide to the supplying pipe 22.

Further, according to embodiments of the present invention, the supplying pipes 20 and 22 shown in FIGS. 2 to 4 may have various configurations depending on the manufacturer's intention. As an example, the supplying pipe 20 or 22 may be configured to spirally wind up along an outer side of the flow pipe 16.

By the configurations shown in FIGS. 2 to 4, according to an embodiment of the present invention, carbon dioxide may be supplied to a lower portion of a flow path created inside the flow pipe 16.

The carbon dioxide supplied to the lower portion of the flow pipe 16 is moved up through the flow path created in the flow pipe 16.

As the carbon dioxide moves up along the flow path in the flow pipe 16, the anode medium 14 over the flow path may be pushed to flow by the carbon dioxide.

If carbon dioxide is steadily supplied through the supplying pipe 20 or 22, the anode medium 14 in the flow pipe 16 is forced to flow as the carbon dioxide travels upwards.

More specifically, the anode medium 14 outside the flow pipe 16 flows into a lower portion of the flow pipe 16 in order to fill the space that is formed as the carbon dioxide moves upwards, and the anode medium 14 at an upper portion of the flow pipe 16 is forced to overflow the flow pipe 16 by the moving-up carbon dioxide.

Accordingly, the anode medium 14 may be circulated to pass through the flow path of the flow pipe 16 in the bath 10.

As the anode medium 14 flows and circulates as above, the mixture of the carbon fuel and the anode medium 14 may be accelerated.

Further, as the mixed carbon fuel and anode medium 14 is circulated through the flow path formed by the flow pipe 16 as above, the carbon fuel and the anode medium 14 abutting the tubular cell 12 are circulated. Therefore, the circulating carbon cell and anode medium 14 may accelerate reactions of the anode of the tubular cell 12.

Figure 5:
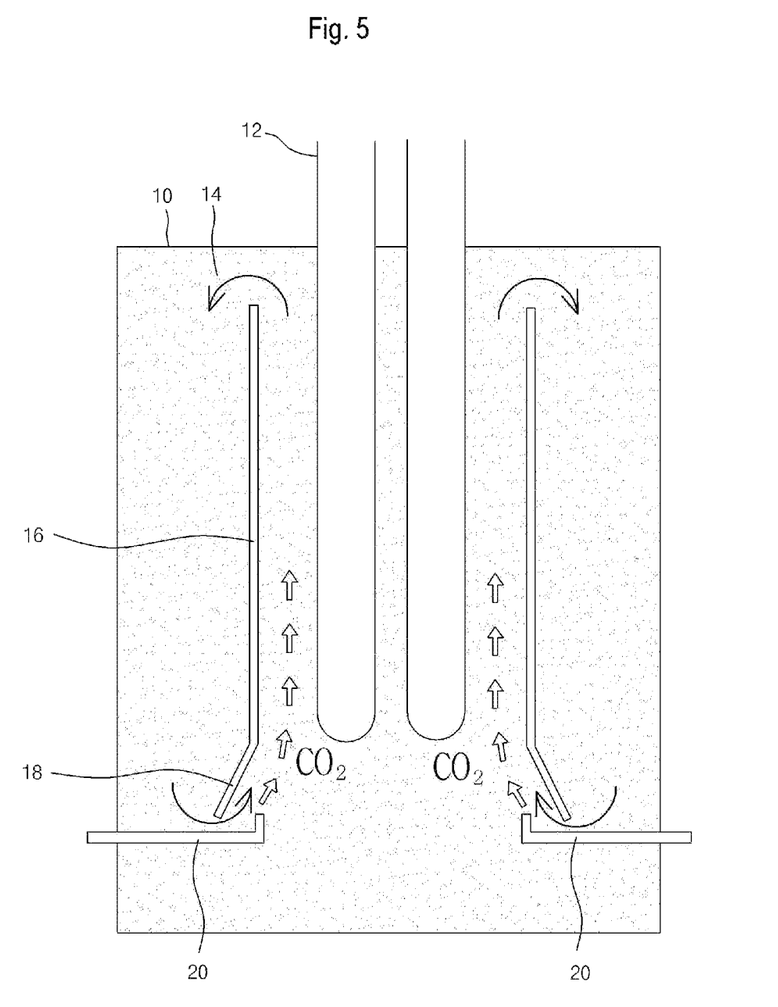
FIGS. 5 to 7 are views illustrating respective corresponding variations of the configurations shown in FIGS. 2 to 4, with as plurality of tubular cells, according to other embodiments of the present invention.
Figure 6:
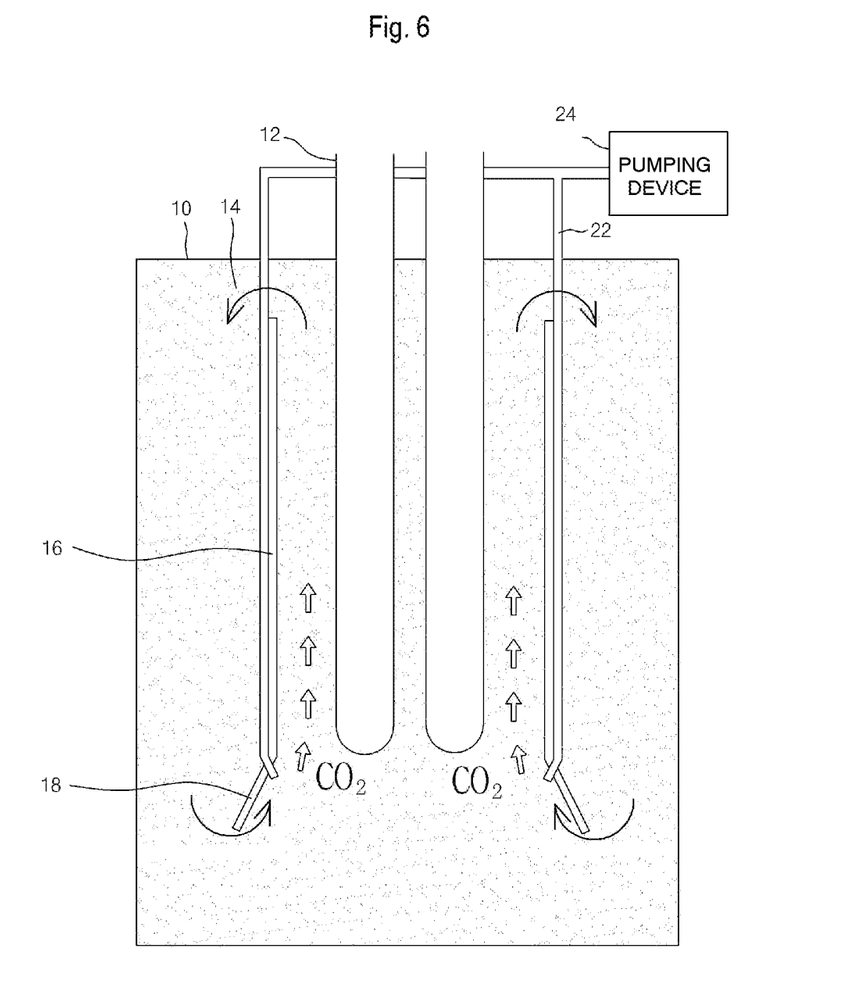
Figure 7:
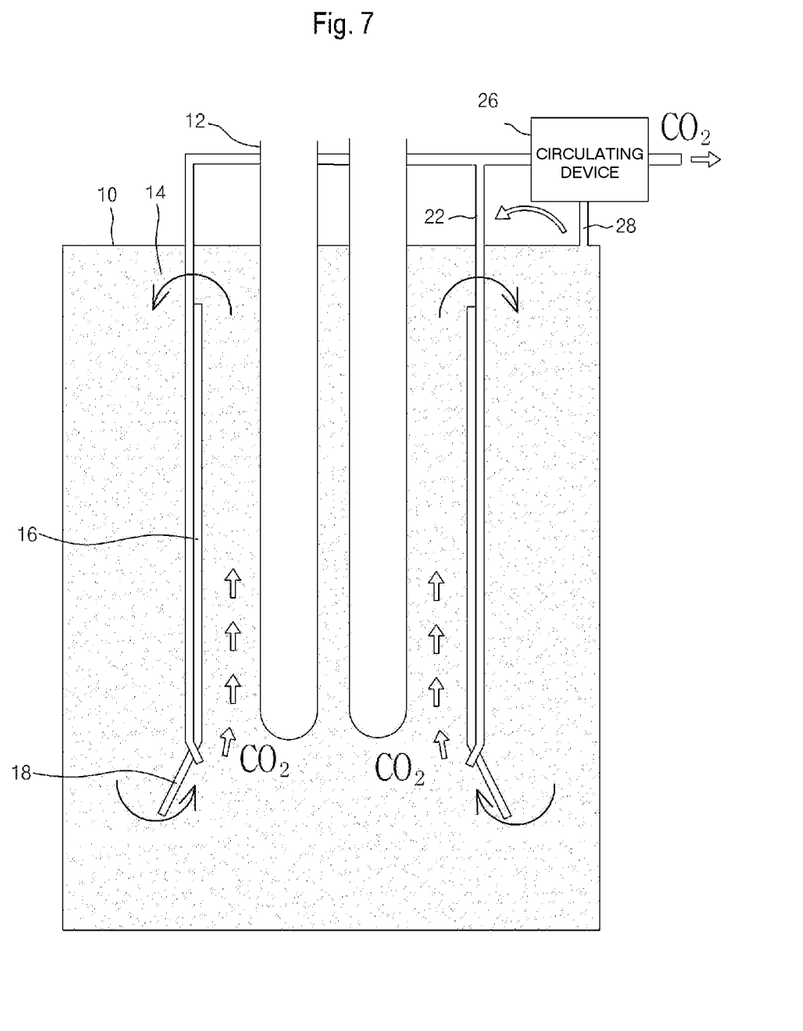

Meanwhile, according to an embodiment of the present invention, a plurality of tubular cells 12 may be configured inside the flow pipe 16, as shown in FIGS. 5 to 7. According to an embodiment of the present invention, two tubular cells 12 are, for the purpose of description, configured as shown in FIGS. 5 to 7.

FIG. 5 illustrates an example in which two tubular cells 12 are configured inside the flow pipe 16, corresponding to FIG. 2, FIG. 6 illustrates an example in which two tubular cells 12 are configured inside the flow pipe 16, corresponding to FIG. 3, and FIG. 7 illustrates an example in which two tubular cells 12 are configured inside the flow pipe 16, corresponding to FIG. 4.

The configurations shown in FIGS. 5 to 7 are substantially the same as those shown in FIGS. 2 to 4 except for a plurality of tubular cells 12 (two tubular cells 12) configured inside the flow pipe 16, and description of the same components or their operations is not repeated.

The number of tubular cells 12 arranged in the flow pipe 16 may be varied depending on the manufacturer's intention considering the flow efficiency of the anode medium.

Also in the embodiments described M connection with FIGS. 5 to 7, as carbon dioxide supplied from an end of the supplying pipe 20 or 22 included in the bubbling means to the inside of the flow pipe 16 moves upwards, the anode medium 14 is caused to flow as described above in connection with FIGS. 2 to 4.

As described above, as the anode medium 14 flows and circulates along the flow path in the flow pipe 16, the mixture of the carbon fuel and the anode medium 14 may be accelerated.

Further, the mixture-accelerated carbon fuel and anode medium 14 circulate, while abutting the plurality of tubular cells 12. Therefore, the circulating carbon cell and anode medium 14 may accelerate reactions of the plurality of anode of the tubular cell 12.

Figure 8:
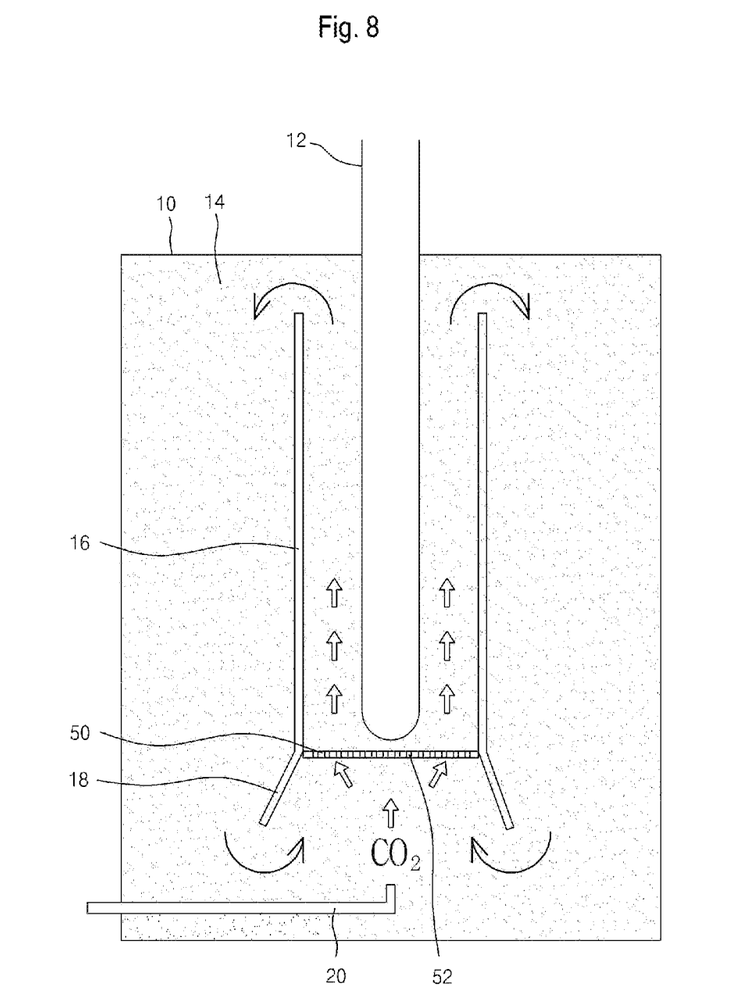
FIG. 8 is a view illustrating a variation of the configuration shown in FIG. 2, with a distributing member, according to another embodiment of the present invention.

Meanwhile, according to an embodiment of the present invention, a distributing means 50 may be further provided on the flow path m the flow pipe 16 to distribute gas bubbles supplied from the supplying pipe 20 of the bubbling means and to supply upward the distributed gas bubbles.

The distributing member 50 may be formed of a disc with multiple through-holes 52 as shown in FIG. 8 According to the manufacturer's intention, the distributing member 50 may have various shapes. In an exemplary variation thereof, the distributing member 50 may be formed of a ring-shaped plate with multiple through-holes 52, the ring-shaped plate structured to allow a tubular cell 12 to pass through the center thereof. Further, the distributing member 50 may be structured to have a porous layer.

Figure 9:
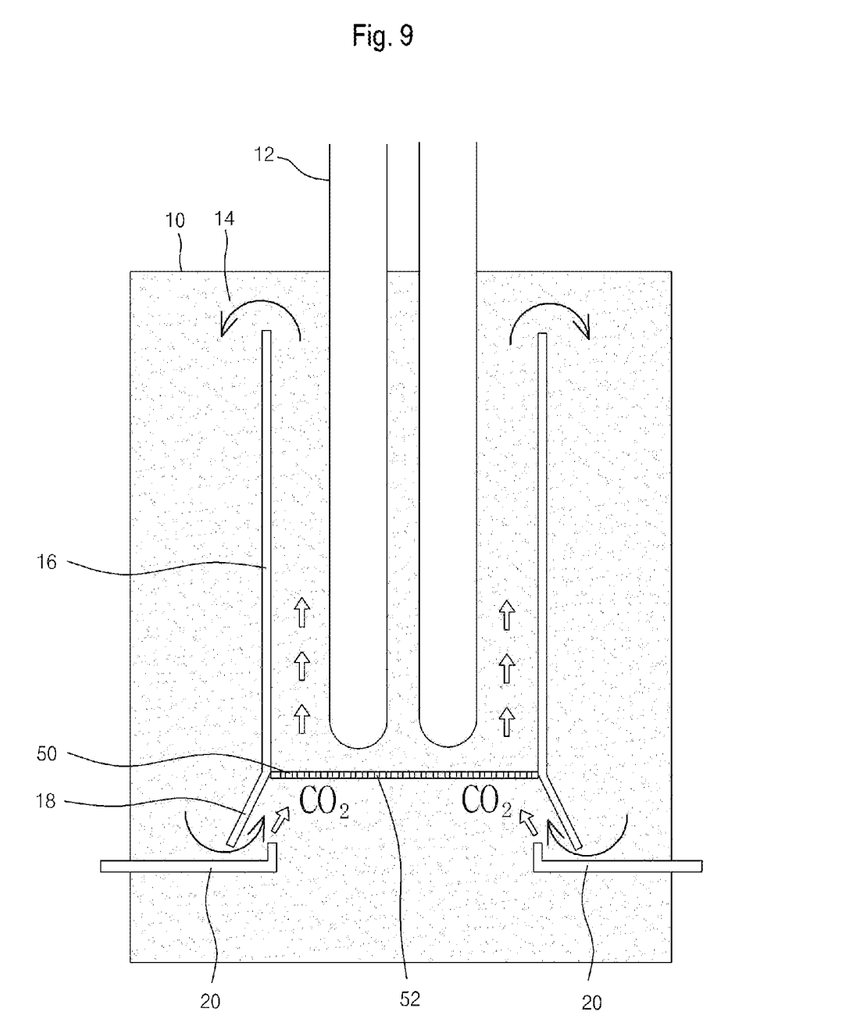
FIG. 9 is a view illustrating a variation of the configuration shown in FIG. 5, with a distributing member, according to another embodiment of the present invention.

As shown in FIG. 9, the distributing member 50 provided under a plurality of tubular cells 12 in the flow pipe 16 may distribute gas bubbles supplied from the supplying pipe 20 of the bubbling means and supply upward the distributed gas bubbles.

In the embodiment described in connection with FIG. 9, gas bubbles supplied by the bubbling means may be evenly distributed to the plurality of tubular cells 12, so that the anode medium 14 may uniformly flow in the flow pipe 16 in which the plurality of tubular cells 12 are arranged.

According to an embodiment of the present invention, a fuel supplying apparatus for a direct carbon fuel cell, as configured above, together with one or more tubular cells each having an cathode and a anode respectively formed at an inside and outside thereof, with a solid oxide electrolyte formed between the cathode and the anode, may configure a direct carbon fuel cell system. Accordingly, the fuel supplying apparatus according to the present invention may be configured to supply a forcedly-flowing anode medium to the tubular cells.

As such, according to the present invention, a flow of the anode medium in the flow pipe may be secured, forcing the anode medium to be supplied to the direct carbon fuel cell, with the anode medium mixed with a carbon, fuel.

Therefore, the concentration polarization at the anodes of the tubular cells may be reduced, leading to an increased output density.

What is claimed is:

1. A fuel supplying apparatus for a direct carbon fuel cell, comprising:
    a flow pipe forming a flow path around a tubular cell soaked in a anode medium mixed with a carbon fuel; and
    a bubbling means supplying a gas from under the flow pipe to an inside of the anode medium so that the anode medium flows as the gas moves up, wherein the flow of the anode medium forces the carbon fuel to be supplied to an anode of the tubular cell, wherein the flow path is formed in the flow pipe, wherein an end of a supplying pipe included in the bubbling means is configured to supply the gas to the flow path between the tubular cell and the flow pipe, wherein the supplying pipe included in the bubbling means extends from an upper portion to a lower portion thereof along an outer wall of the flow pipe, and wherein the end of the supplying pipe is formed inside a lower portion of the flow pipe.

2. The fuel supplying apparatus of claim 1, wherein the flow pipe includes a collecting part at a lower portion thereof, the collecting part widening downwards, and wherein the collecting part guides the gas supplied from under the flow pipe to the flow path in the flow pipe.

3. The fuel supplying apparatus of claim 1, wherein the supplying pipe is spirally formed along the outer wall of the flow pipe.

4. The fuel supplying apparatus of claim 1, further comprising a distributing member on the flow path in the flow pipe, the distributing member distributing the gas supplied from the bubbling means and supplying upward the distributed gas.

5. The fuel supplying apparatus of claim 4, wherein the distributing member is formed of a disc with multiple through-holes.

6. The fuel supplying apparatus of claim 4, wherein the distributing member includes a porous layer.

7. The fuel supplying apparatus of claim 1, wherein the bubbling means includes a pumping device generating and providing the gas.

8. The fuel supplying apparatus of claim 1, wherein the bubbling means recirculates and supplies the gas that is generated by an electrochemical reaction of the carbon fuel and is then discharged to an outside of the anode medium.

9. The fuel supplying apparatus of claim 1, wherein the gas includes carbon dioxide.

10. The fuel supplying apparatus of claim 1, wherein the anode medium includes a molten carbonate.

11. The fuel supplying apparatus of claim 1, wherein the flow pipe forms the flow path around a plurality of tubular cells.

12. A direct carbon fuel cell system, comprising:
one or more tubular cells each including a cathode formed at an inside thereof, a anode formed at an outside thereof, and a solid oxide electrolyte formed between the cathode and the anode; and
a fuel supplying apparatus supplying a forcedly flowing anode medium to the tubular cells, wherein the fuel supplying apparatus comprises:
a flow pipe forming a flow path around a tubular cell soaked in a anode medium mixed with a carbon fuel; and
a bubbling means supplying a gas from under the flow pipe to an inside of the anode medium so that the anode medium flows as the gas moves up, wherein the flow of the anode medium forces the carbon fuel to be supplied to a anode of the tubular cell, wherein the flow path is formed in the flow pipe, wherein an end of a supplying pipe included in the bubbling means is configured to supply the gas to the flow path between the tubular cell and the flow pipe, wherein the supplying pipe included in the bubbling means extends from an upper portion to a lower portion thereof along an outer wall of the flow pipe, and wherein the end of the supplying pipe is formed inside a lower portion of the flow pipe.

* * * * *